(12) United States Patent
Watanabe et al.

(10) Patent No.: US 7,107,217 B2
(45) Date of Patent: Sep. 12, 2006

(54) VOICE INTERACTIVE SYSTEM AND VOICE INTERACTIVE METHOD

(75) Inventors: Satoru Watanabe, Kawasaki (JP); Hayuru Ito, Kawasaki (JP); Takahiro Kii, Kawasaki (JP); Yuji Kijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 711 days.

(21) Appl. No.: 09/940,522

(22) Filed: Aug. 29, 2001

(65) Prior Publication Data

US 2002/0087321 A1 Jul. 4, 2002

(30) Foreign Application Priority Data

Dec. 28, 2000 (JP) ............................. 2000-400480

(51) Int. Cl.
*G10L 21/00* (2006.01)
*G10L 15/22* (2006.01)

(52) U.S. Cl. ................. 704/270; 379/88.01; 704/270.1

(58) Field of Classification Search ................ 704/275, 704/270, 258, 231, 251, 270.1; 379/93.09, 379/88.18, 88.01
See application file for complete search history.

(56) References Cited

U.S. PATENT DOCUMENTS

| | | | | |
|---|---|---|---|---|
| 4,797,910 A | * | 1/1989 | Daudelin | 379/88.01 |
| 5,163,083 A | * | 11/1992 | Dowden et al. | 379/88.03 |
| 5,164,981 A | * | 11/1992 | Mitchell et al. | 379/88.01 |
| 5,583,922 A | * | 12/1996 | Davis et al. | 379/93.09 |
| 5,805,771 A | * | 9/1998 | Muthusamy et al. | 704/232 |
| 5,867,562 A | * | 2/1999 | Scherer | 379/88.21 |
| 6,173,266 B1 | * | 1/2001 | Marx et al. | 704/270 |
| 6,243,684 B1 | * | 6/2001 | Stuart et al. | 704/275 |
| 6,411,687 B1 | * | 6/2002 | Bohacek et al. | 379/88.21 |

FOREIGN PATENT DOCUMENTS

| | | |
|---|---|---|
| JP | 60-246468 | 12/1985 |
| JP | 3-88466 | 4/1991 |
| JP | 8-76965 | 3/1996 |
| JP | 9-265378 | 10/1997 |
| JP | 10-51550 | 2/1998 |
| JP | 10-124086 | 5/1998 |
| JP | 10-222467 | 8/1998 |
| JP | 11-346266 | 12/1999 |

OTHER PUBLICATIONS

Japanese Office Action for corresponding Japanese Patent Application No. 2000-400480 dated Jun. 18, 2006.

* cited by examiner

*Primary Examiner*—David Hudspeth
*Assistant Examiner*—James S. Wozniak
(74) *Attorney, Agent, or Firm*—Staas & Halsey LLP (57) ABSTRACT

There is provided a voice Interactive system for inputting user's voice information, conducting voice recognition with respect to the voice information, analyzing the contents of the voice information, controlling a transmission path of the voice information in accordance with the contents of the voice information, outputting a synthesized voice, extracting the contents of a response corresponding to the voice information by referring to a knowledge database, and creating the synthesized voice in accordance with the contents of a response, wherein in the case where it is monitored at all times whether or not use's interaction is being smoothly conducted, and when it is determined that the user's interaction is not being smoothly conducted, a third-party user is allowed to participate,as a helper, in the users interaction.

15 Claims, 7 Drawing Sheets

(PRIOR ART)

VOICE INTERACTIVE SYSTEM AND VOICE INTERACTIVE METHOD

BACKGROUND OF THE INVENTION

1. Field of the Invention

The present invention relates to a voice interactive system and a voice interactive method for allowing a voice interactive system to smoothly function, in which a user realizes various functions by interaction with synthesized voice generated by the system.

2. Description of the Related Art

Recently, due to the enhancement of a computer processing speed, the enlargement of an information capacity that can be used, and the rapid advancement of a voice recognition technique, voice recognition at a word level can be put into practical use without any problem. Therefore, a voice recognition technique is also becoming one of important techniques for configuring a system. The use of such a voice recognition technique enables various problems to be solved by using a voice interactive interface utilizing only a voice without a high-level graphical interface.

As described above, a voice interactive system is being developed in various fields, which allows a user to solve problems in the user's intended order by the use of a voice interactive interface, and which allows the ability of oral communication owned by a human to be fully taken advantage of.

Figure 1:
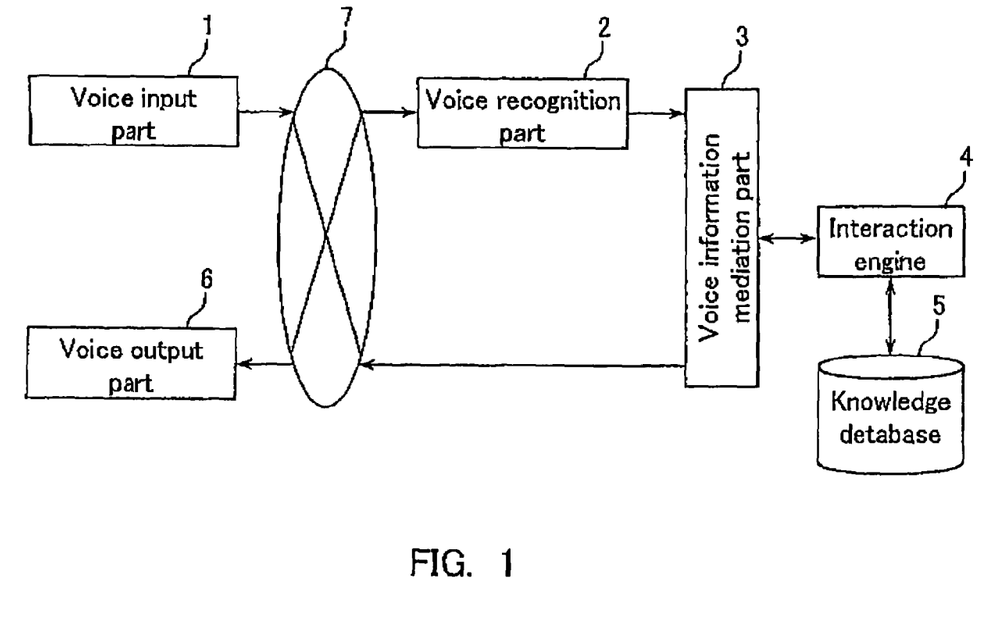
FIG. 1 shows a configuration of a conventional voice interactive system.

FIG. 1 shows a configuration of a conventional voice interactive system. In FIG. 1, reference numeral 1 denotes a voice input part through which a user inputs voice information. As an input medium, file transfer for a web file and the like, as well as a microphone, can be contemplated. The input voice information is sent to a voice recognition part 2 through a network 7 or the like. As the network 7, various connection forms such as the Internet and WAN/LAN can be contemplated.

Reference numeral 2 denotes a voice recognition part that analyzes the contents of the input voice information. It is also considered that the voice recognition part 2 has a noise reduction function for the purpose of preventing problems in the case where the input voice contains noise.

Reference numeral 6 denotes a voice output part that outputs a response to the voice input from the voice input part 1 as a synthesized voice. An output method is not limited to an output based on a voice, and the contents of a response may be displayed on a display apparatus.

Reference numeral 3 denotes a voice information mediation part, which controls a response timing among the voice input part 1, the voice output part 6, and an interaction engine 4. Reference numeral 4 denotes an interaction engine, which refers to a knowledge database 5 in accordance with the contents of the input voice to extract the most suitable contents of a response. Therefore, the performance of the interaction engine 4 directly influences the performance of the voice interactive system.

However, in the above-mentioned conventional voice interactive system, a current voice recognition technique has not reached a level with a 100% recognition precision. Therefore, the intention of user's uttered voice may not be sufficiently recognized. Furthermore, even with the interaction engine 4 having high performance, it is impossible to completely handle human daily conversation, and it is easily expected that conversation with the contents that cannot be handled by such an interaction engine is conducted.

In the above-mentioned case, it is considered that the conversation that cannot be handled only by the interaction engine 4 may be handled by allowing a third-party user or an operator who is familiar with the contents of the conversation to participate therein as a helper.

For example, JP 7(1995)-19239 B discloses a system that allows a user to interact with an operator (i.e., a third-party user) when detecting that a particular word is contained in an input voice.

Furthermore, JP 8(1996)-76965 A discloses a voice recognition system in which a user can request mediation of an operator when the user is at a loss how to use the system. JP 10(1998)-124086 A discloses a voice interactive system that allows a system supporter to directly respond to an input voice in the case where an expert system alone cannot respond thereto.

However, according to the invention disclosed, for example, in JP 7(1995)-19239 B, the case is also assumed where operator's help is required even if a particular word is not contained in an input voice. Furthermore, it is practically difficult to extract words on the assumption of various cases. Therefore, it is actually difficult to configure such a system.

According to the invention disclosed in JP 8(1996)-76965 A, a user cannot get operator's help without the user's intention. Therefore, regarding interactive contents that would be easily determined to be useless under the supervision of a third-party user, operator's help can be provided only after a considerable period of time.

According to the invention disclosed in JP 10(1998)-124086 A, only in the case of interaction that is not contained in a rule database in an expert system, help of a system supporter can be provided. If a knowledge level of a user is not matched with a knowledge level of a rule database, even interaction contained in the rule database cannot be conducted smoothly, which makes it difficult for a user to understand the interaction.

SUMMARY OF THE INVENTION

Therefore, with the foregoing in mind, it is an object of the present invention to provide a voice interactive system and a voice interactive method, capable of automatically controlling a timing at which an operator mediates in accordance with a knowledge level of a user.

In order to achieve the above-mentioned object, a voice interactive system of the present invention includes: a voice information input part for inputting user's voice information from a user terminal; a voice recognition part for conducting voice recognition with respect to the voice information, and analyzing contents of the voice information; a voice information mediation part for controlling a transmission path of the voice information in accordance with the contents of the voice information; an interaction engine for extracting contents of a response corresponding to the voice information by referring to a knowledge database, and creating a synthesized voice in accordance with the contents of a response; and a voice information output part for outputting the synthesized voice, wherein the voice information mediation part monitors at all times whether or not the user's interaction is being smoothly conducted, and in a case of determining that the user's interaction is not being smoothly conducted, allows a third-party user to participate in interaction between the user and the interaction engine from another terminal as a helper.

Because of the above-mentioned configuration, even in the case where there is a large difference between a knowledge level of a knowledge database and a knowledge level of a user, a timing at which operator's help is provided can be automatically controlled.

In the voice interactive system of the present invention, it is preferable that the voice information mediation part determines whether or not the user's interaction is being smoothly conducted based on whether or not an accumulation value of the number of times at which the contents of a response are not found in the knowledge database exceeds a set limit number, and in a case where the accumulation value exceeds the set limit number, allows a third-party user to participate in the interaction between the user and the interaction engine from another terminal as a helper. The reason for this is as follows. Even when an item of interest is not found in the knowledge database at the first attempt, operator's help is not necessarily required immediately; however, in the case where appropriate items are not hit as a response even after some trial and error, operator's help is required.

In the voice interactive system of the present invention, it is preferable that the voice information mediation part determines whether or not the user's interaction is being smoothly conducted based on an average reaction time from a response of the interaction engine to a reaction of the user, and in a case where the average reaction time exceeds a first threshold value or in a case where the average reaction time is below a second threshold value, allows a third-party user to participate in the interaction between the user and the interaction engine from another terminal as a helper. A user's average reaction time is within a predetermined range while interaction is being smoothly conducted. However, when interaction becomes redundant, a reaction time is likely to become short gradually. On the other hand, when the user cannot follow the contents of interaction, a reaction time is likely to become long gradually. Therefore, such properties peculiar to interaction are utilized.

In the voice interactive system of the present invention, it is preferable that the voice information mediation part determines whether or not the user's interaction is being smoothly conducted based on an evaluation value of average sound quality of the voice information input by the user, and in a case where the evaluation value of average sound quality exceeds a first threshold value or in a case where the evaluation value of average sound quality is below a second threshold value, allows a third-party user to participate in the interaction between the user and the interaction engine from another terminal as a helper. An average value of a pitch or the like of a voice input by a user is within a predetermined range while interaction is being smoothly conducted. When interaction becomes redundant, an average value of a pitch as well as a voice pitch is likely to become high gradually. On the other hand, when a user cannot follow the contents of interaction, an average value of a pitch as well as a voice pitch is likely to become low gradually. Therefore, such properties peculiar to interaction are utilized.

In the voice interactive system of the present invention, it is preferable that the voice information mediation part determines a progress of interaction in accordance with an interaction time from a beginning of the user's interaction and the number of accesses to the interaction engine, and a participation form of the third-party user is successively changed, in an increasing order of the progress of interaction, from involvement in which the contents of interaction with the user is displayed to the third-party user and the contents of interaction is updated by the third-party user, parallel input in which the third-party user conducts an input in parallel with the user, to switching in which the third-party user directly interacts with the user. This is because help is provided in accordance with a level required by a user.

In the voice interactive system of the present invention, the interaction engine further includes an interaction history information storage part for recording interaction history on a user basis, and a helper selection part for selecting the third-party user that is considered to be most familiar with the contents of the interaction from the interaction history as a helper, and the helper most appropriate for contents of the voice information is selected. Because of this configuration, in accordance with the contents of interaction, an appropriate user among those having participated in interaction, as well as an operator specialized in helping, can be selected.

The voice interactive system of the present invention further includes a help request notification part for, in a case where the voice information mediation part determines that the user's interaction is not being smoothly conducted, notifying a third-party helper user of such a fact, wherein in a case where the help request notification part notifies the third-party helper user of the fact that the user's interaction is not being smoothly conducted, the third-party helper user is capable of voluntarily interacting with the user, and in a case where it is detected that only a voice of the third-party helper user continues for a predetermined period of time or longer in interaction between the third-party helper user and the user, the interaction engine interacts only with the third-party helper user. Because of this configuration, an operator specialized in helping is provided with a chance of voluntarily helping a user with interaction. Furthermore, by detecting that the operator specialized in helping takes the initiative in interaction, it is considered that interaction proceeds more smoothly when the operator specialized in helping is allowed to directly interact with the interaction engine.

The voice interactive system of the present invention further includes an interaction history display part for displaying the interaction history stored in the interaction history information storage part to a third-party helper user, and a helper instruction part for receiving a help instruction from the third-party helper user, wherein when the help instruction part receives the help instruction from the third-party helper user, the voice information mediation part enables the interaction between the third-party helper user and the user to be conducted, and when a degree of help of the third-party helper user exceeds a predetermined threshold value in interaction between the third-party helper user and the user, the interaction engine interacts only with the third-party helper user. Because of this configuration, an operator specialized in helping is provided with a chance of voluntarily helping a user with interaction. Furthermore, by detecting that the operator specialized in helping takes the initiative in interaction, it is considered that interaction proceeds more smoothly when the operator specialized in helping is allowed to directly interact with the interaction engine.

Furthermore, the present invention is characterized by software for executing the function of the above-mentioned voice interactive system as processing of a computer. More specifically, the present invention is characterized by a voice interactive method including: inputting user's voice information from a user terminal; conducting voice recognition with respect to the voice information, and analyzing contents of the voice information; controlling a transmission path of the voice information in accordance with the contents of the voice information; and outputting a synthesized voice, in the controlling of a transmission path of the voice information, contents of a response corresponding to the voice information being extracted by referring to a knowledge database, and a synthesized voice being created in accordance with the contents of a response, wherein in the controlling of a transmission path of the voice information, it is monitored at all times whether or not the user's interaction is being smoothly conducted, and in a case where it is determined that the user's interaction is not being smoothly conducted, a third-party user is allowed to participate in interaction between the user and the interaction engine from another terminal as a helper, and a computer program storing these operations.

Because of the above-mentioned configuration, by loading the program onto a computer for execution, even in the case where there is a large difference between a knowledge level of a knowledge database and a knowledge level of a user, a timing at which operator's help is provided can be automatically controlled.

These and other advantages of the present invention will become apparent to those skilled in the art upon reading and understanding the following detailed description with reference to the accompanying figures.

DESCRIPTION OF THE PREFERRED EMBODIMENTS

Figure 2:
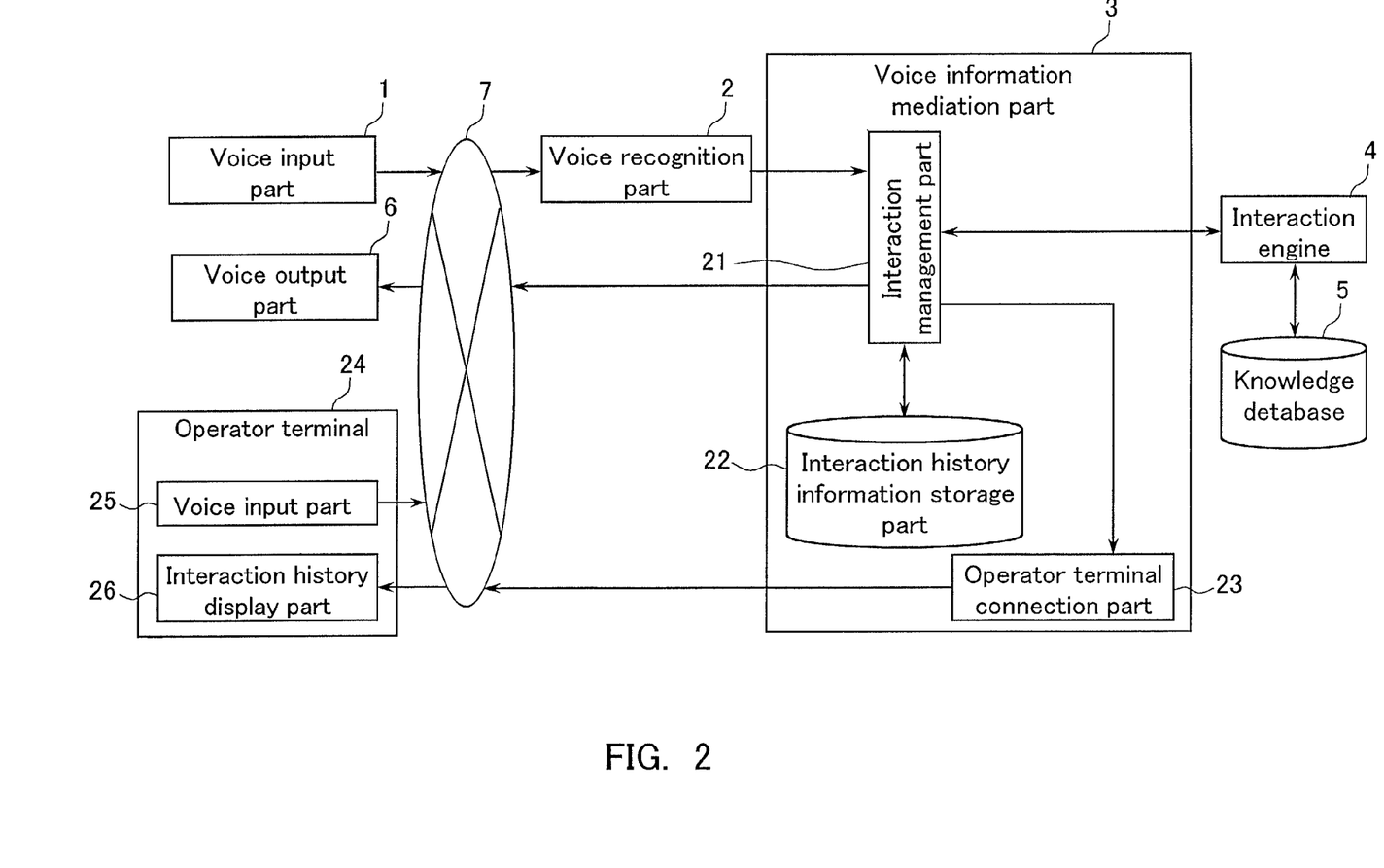
FIG. 2 shows a configuration of a voice interactive system of an embodiment of the present invention.

Hereinafter, a voice interactive system of an embodiment of the present invention will be described with reference to the drawings. FIG. 2 shows a configuration of the voice interactive system of the embodiment of the present invention. The same components as those in FIG. 1 are denoted with the same reference numerals as those therein. The detailed description thereof will be omitted here.

A substantial difference between the voice interactive systems shown in FIGS. 1 and 2 lies in that an interaction management part 21 is provided in the system shown in FIG. 2 so as to monitor a user's interaction situation at all times. The interaction management part 21 obtains interaction history information while monitoring user's interaction, and stores the information in an interaction history information storage part 22.

The interaction history information includes the contents of interaction recognized by a voice recognition part 2 on a user basis, a time required for a user to respond to interaction, a reaction time up to a user responds to interaction, information on sound quality such as the pitch of an input voice, an accumulation value of the number of hits that are not found in a knowledge database 5 as information obtained through a voice information mediation part 3, and the like.

An accumulation time from the beginning of user's interaction is calculated from a user's response time, and an average value of the pitch or the like of an input voice is calculated on the basis of a user's input voice. Based on these results, including the accumulation value of the number of hits that are not found in the knowledge database 5, and the like, it is possible to determine whether or not user's interaction is being smoothly conducted, to check on the progress of interaction, and the like.

The voice information mediation part 3 is provided with a function of activating an operator terminal connection part 23 as a new function. The voice information mediation part 3 determines whether or not predetermined conditions are satisfied. In the case where the predetermined conditions are satisfied, the voice information mediation part 3 determines that user's interaction is not being smoothly conducted, to allow the operator terminal connection part 23 to be connected to an operator terminal for helping user's interaction.

As the predetermined conditions to be determined, various conditions are considered. First, whether or not user's interaction is being smoothly conducted is determined based on whether or not an accumulation value of the number of times at which items appropriate as the contents of a response are not registered in the knowledge database 5 (i.e., the number of hits that are not found in the knowledge database 5) exceeds a set limit number.

More specifically, in the case where items appropriate as the contents of a response are not registered, a response for urging a user to do another input is made. After some trial and error, appropriate items may be hit as a response. Therefore, even when an item of interest is not found at the first attempt, operator's help is not necessarily required immediately. On the other hand, in the case where appropriate items are not hit as a response even after some trial and error, operator's help is required. Thus, in the case where the number of hits that are not found is accumulated, and the accumulation value exceeds a predetermined threshold value, the operator terminal connection part 23 is activated to be connected to an operator terminal so that an operator can participate in user's interaction.

Whether or not user's interaction is being smoothly conducted may also be determined based on an average reaction time on a user's response basis, calculated from the interaction history information stored in the interaction history information storage part 22.

More specifically, a user's reaction time is within a predetermined range while interaction is being smoothly conducted. However, when interaction becomes redundant, a reaction time is likely to become short gradually. When the user cannot follow the contents of interaction, a reaction time is likely to become long gradually. Utilizing such properties peculiar to interaction, in the case where an average reaction time exceeds a predetermined threshold value that is an upper limit of a reaction time in ordinary interaction, or in the case where an average reaction time is below a predetermined threshold value that is a lower limit of a reaction time in ordinary interaction, the operator terminal connection part 23 is activated to be connected to an operator terminal so that an operator can participate in user's interaction.

Furthermore, whether or not user's interaction is being smoothly conducted may also be determined based on an average pitch or the like of voice information input by a user, calculated from the interaction history information stored in the interaction history information storage part 22.

More specifically, an average value of a pitch or the like of a voice input by a user is within a predetermined range while interaction is being smoothly conducted. When interaction becomes redundant, an average value of a pitch as well as a voice pitch is likely to become high gradually. When a user cannot follow the contents of interaction, an average value of a pitch as well as a voice pitch is likely to become low gradually. Utilizing such properties peculiar to interaction, in the case where an average value of a pitch or the like of a voice input by a user exceeds a predetermined threshold value that is an upper limit of an average value of a voice pitch or the like in ordinary interaction, or in the case where an average value of a pitch or the like of a voice input by a user is below a predetermined threshold value that is a lower limit of an average value of a voice pitch or the like in ordinary interaction, the operator terminal connection part 23 is activated to be connected to an operator terminal so that an operator can participate in user's interaction.

Figure 3:
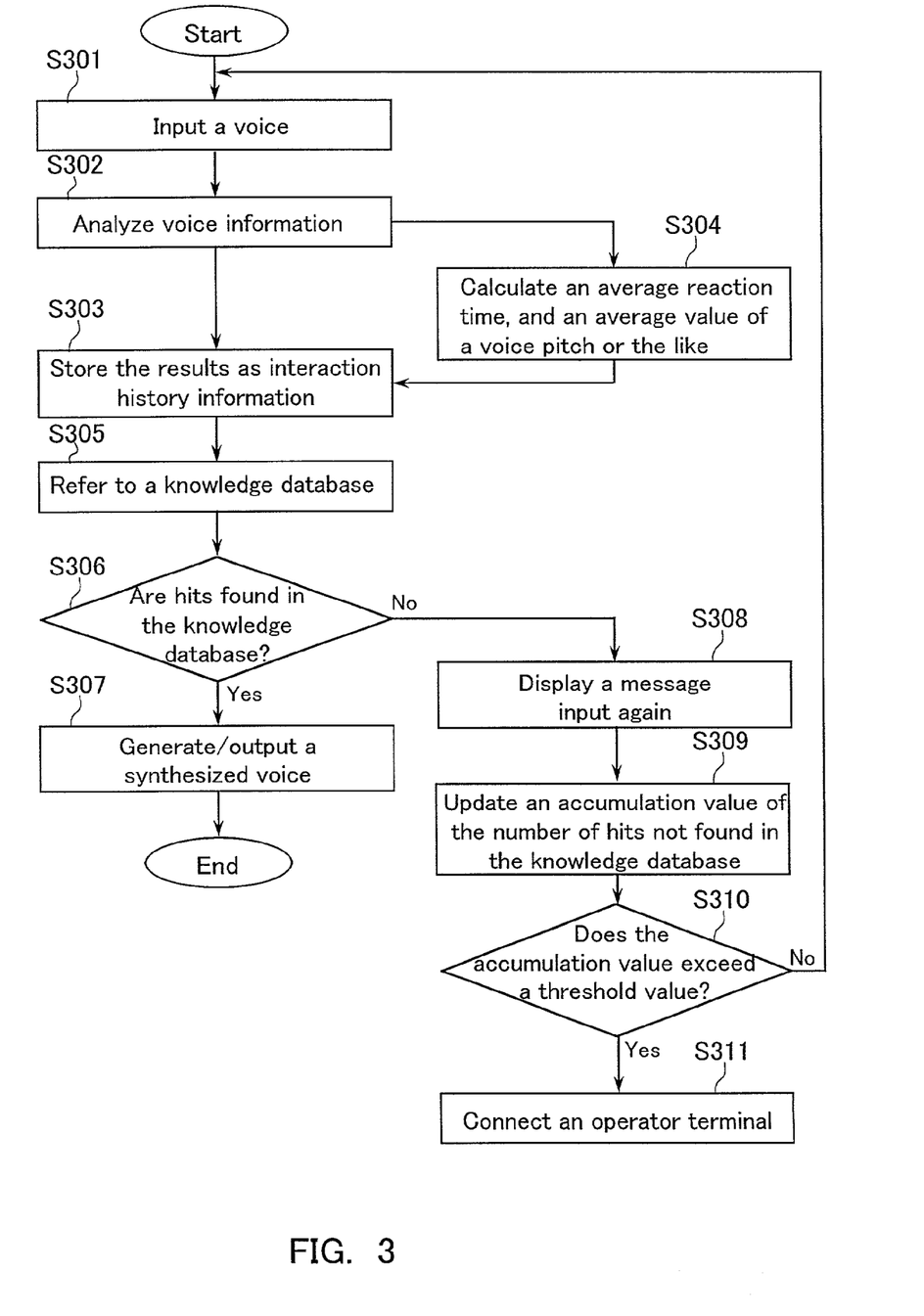
FIG. 3 is a flow chart illustrating processing in the voice interactive system of the embodiment of the present invention.

Next, a processing flow of a program for realizing the voice interactive system of the embodiment of the present invention will be described. FIG. 3 is a flow chart illustrating processing of a program for realizing the voice interactive system of the embodiment of the present invention.

In FIG. 3, when a user inputs a voice (Operation 301), the voice is recognized, and the contents of the input voice information are analyzed (Operation 302). Then, the results thus obtained are stored as interaction history information (Operation 303). Simultaneously, an average reaction time excluding a time of beginning of interaction, and an average value of a voice pitch or the like on an input voice basis are calculated, and similarly stored as interaction history information (Operation 304).

Next, referring to the knowledge database based on the contents of an input voice (Operation 305), if information corresponding to the contents of an input voice is in the knowledge database (Operation 306: Yes), the contents of a response are automatically generated based on the information, and output as a synthesized voice (Operation 307). Thus, interaction is continued.

On the other hand, if there is no knowledge corresponding to the contents of an input voice in the knowledge database (Operation 306: No), a message for urging another input is displayed (Operation 308), and this is accumulated in the interaction history information as the number of hits that are not found in the knowledge database (Operation 309).

Regarding the interaction history information, in the case where an accumulation value of the number of hits that are not found in the knowledge database exceeds a predetermined threshold value (Operation 310: Yes), it is determined that operator's help is required, and an operator terminal is connected with the interaction (Operation 311).

As described above, in the present embodiment, in the case where the difference between a knowledge level of the knowledge database and a knowledge level of a user is large, it is possible to automatically control a timing at which operator's help is provided.

Furthermore, based on the interaction history information stored in the interaction history information storage part 22, an interaction time from the beginning of user's interaction and an accumulation value of the number of accesses to the interaction engine 4 can also be obtained. In the case where the interaction time is long, and the accumulation value of the number of accesses to the interaction engine 4 is large, the progress of user's interaction is considered to be high.

Figure 4:
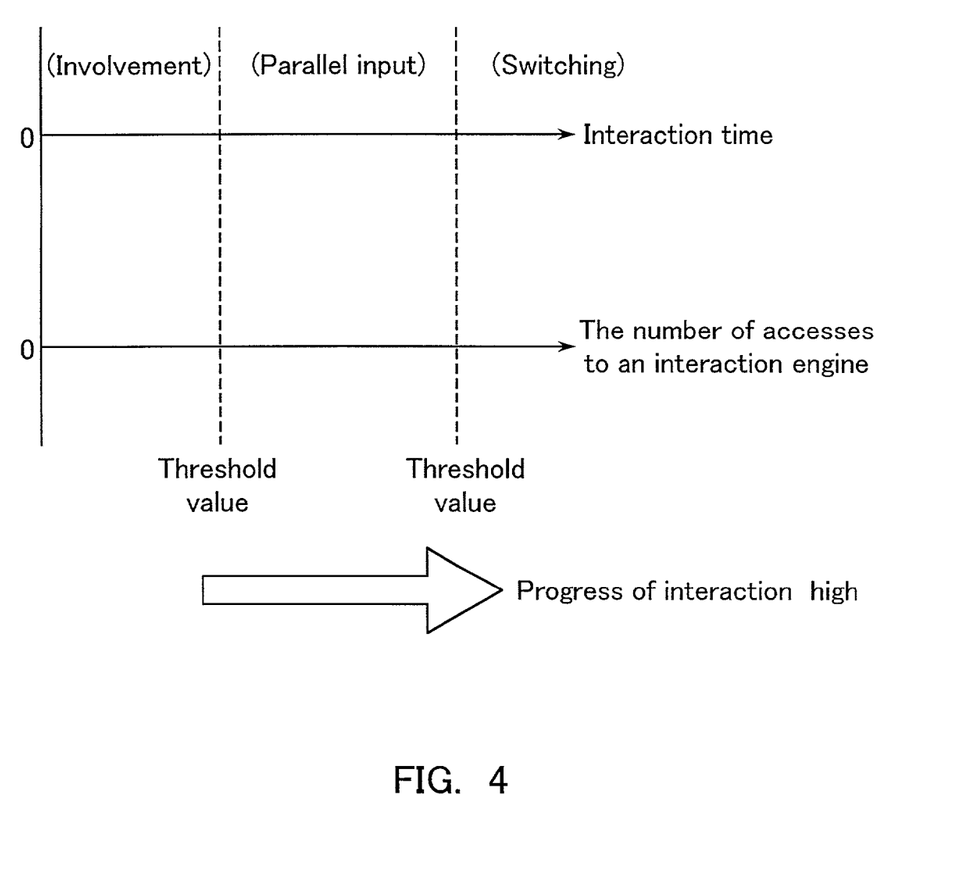
FIG. 4 schematically shows how to determine a help level.

A method for allowing an operator to help a user may be changed based on the progress of interaction, using an interaction time and an accumulation value of the number of accesses to the interaction engine 4 as evaluation values. More specifically, as shown in FIG. 4, in the case where an interaction time is short, or in the case where an accumulation value of the number of accesses to the interaction engine 4 is small, the progress of interaction is determined to be low, and a method for allowing an operator to determine the necessity of help is considered to be sufficient.

Specifically, only in the case where the contents of interaction are displayed at the operator terminal 24 before being output to a user, and an operator determines that some help is needed, the contents of an output may be updated. This is because there is a high possibility that interaction can proceed without an operator by further repetition of accesses to the interaction engine 4. Such an arbitrary helping method by an operator is referred to as "involvement".

The contents of interaction at the operator terminal 24 are displayed by the interaction history display part 26, and an operator's input for help is done with a voice through the voice input part 25.

In the case where an interaction time is accumulated to some degree, or in the case where an accumulation value of the number of accesses to the interaction engine 4 becomes a certain degree of value, it is determined that the progress of interaction is increased to some degree, and more active help by an operator is considered to be required.

More specifically, it may be considered that the contents of interaction are displayed to a user as well as the operator terminal 24, and an operator inputs a new output from the standpoint of a third-party user. In the case where it is determined that interaction is not being conducted smoothly irrespective of whether the progress of interaction has been made to some degree, it is considered that there are insufficient portions only by repetition of accesses to the interaction engine 4. Such an active helping method by an operator is referred to as "parallel input".

Also in this case, the contents of interaction at the operator terminal 24 are displayed by the interaction history display part 26, and an operator's input for help is done with a voice through the voice input part 25.

Furthermore, in the case where a considerable amount of interaction time is accumulated, or in the case where an accumulation value of the number of accesses to the interaction engine 4 is very high, it is determined that the progress of interaction is very high, and active help by an operator is considered to be required. Specifically, it is considered that an operator directly interacts with a user. This is because there is a high possibility that interaction cannot be continued by the accesses to the interaction engine 4. Such a helping method without using the interaction engine 4 so that an operator can directly provide help is referred to as "switching".

Also in this case, the contents of interaction at the operator terminal 24 are displayed by the interaction history display part 26, and an operator's input for help is done with a voice through the voice input part 25.

Thus, strictness and lenience of helping means by an operator can be determined in accordance with the progress of interaction, and operator's help at a level required by a user can be automatically determined.

Figure 5:
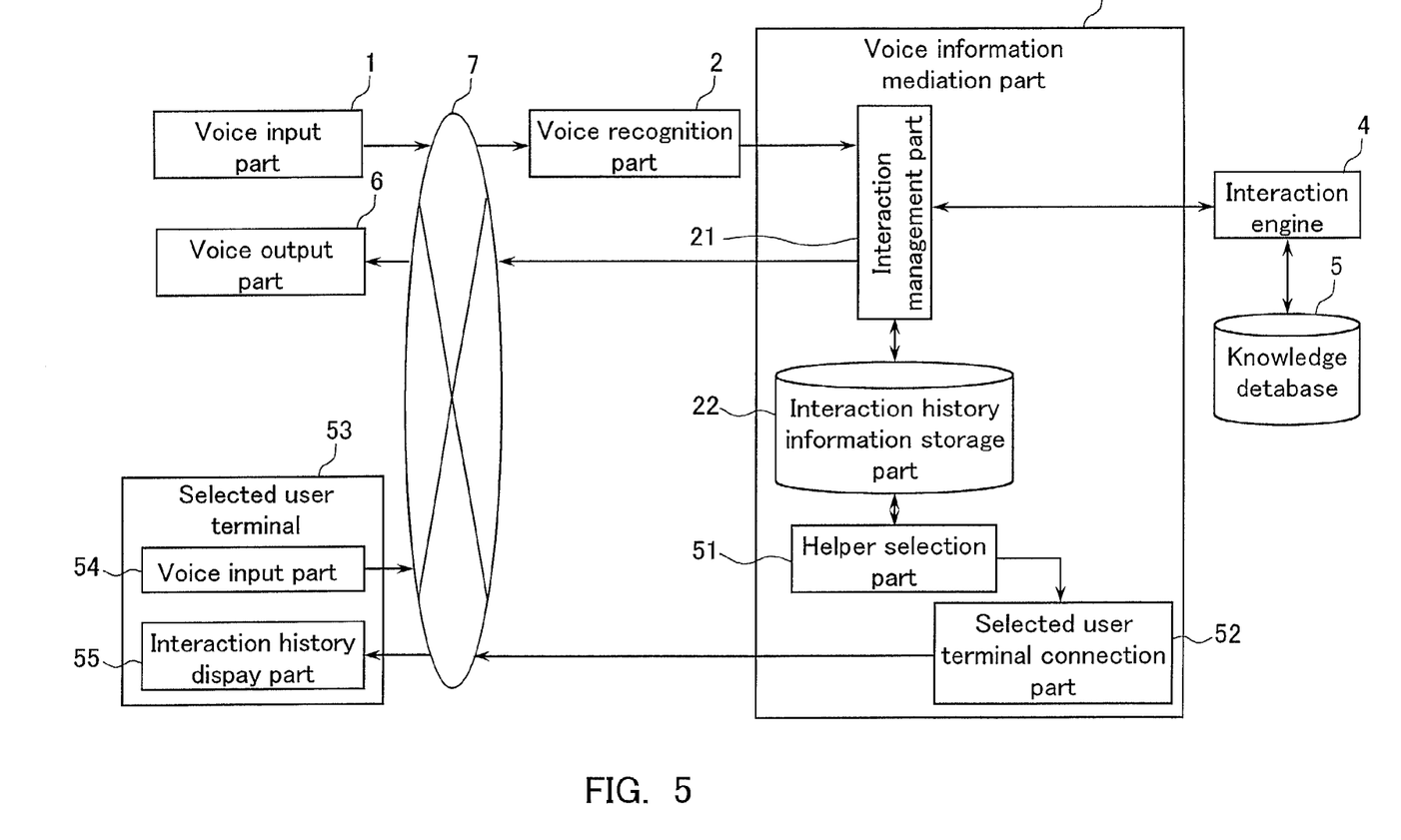
FIG. 5 shows a configuration of the voice interactive system of an embodiment of the present invention.

An operator is not required to be an exclusive operator. For example, an operator may be one of the other users accessing the same application environment on the network, who is familiar with the contents of voice information. In this case, as shown in FIG. 5, a helper selection part 51 is required. By referring to the interaction history information storage part 22 storing history of the contents of user's interaction, the helper selection part 51 selects one of the other users in the interaction regarding the same or similar contents previously conducted, who is considered to be most familiar with the contents. Furthermore, the voice information mediation part 3 determines a connection destination of a user terminal.

More specifically, in FIG. 5, the voice information mediation part 3 extracts the previously conducted interaction regarding the contents of input voice information by referring to the interaction history information storage part 22. The helper selection part 51 selects one of the other users, who is considered to be most familiar with the contents. Thus, a selected user terminal connection part 52 is activated to be connected to a terminal of the selected user.

At the selected user terminal 53, the interaction history is displayed by the interaction history display part 55, and a helping action is conducted through the voice input part 54 in place of an operator with the knowledge of the selected user.

Furthermore, based on the interaction history information stored in the interaction history information storage part 22, it can be detected that a user cannot smoothly proceed interaction by various methods. In this case, an operator may determine to help a user with the interaction.

Figure 6:
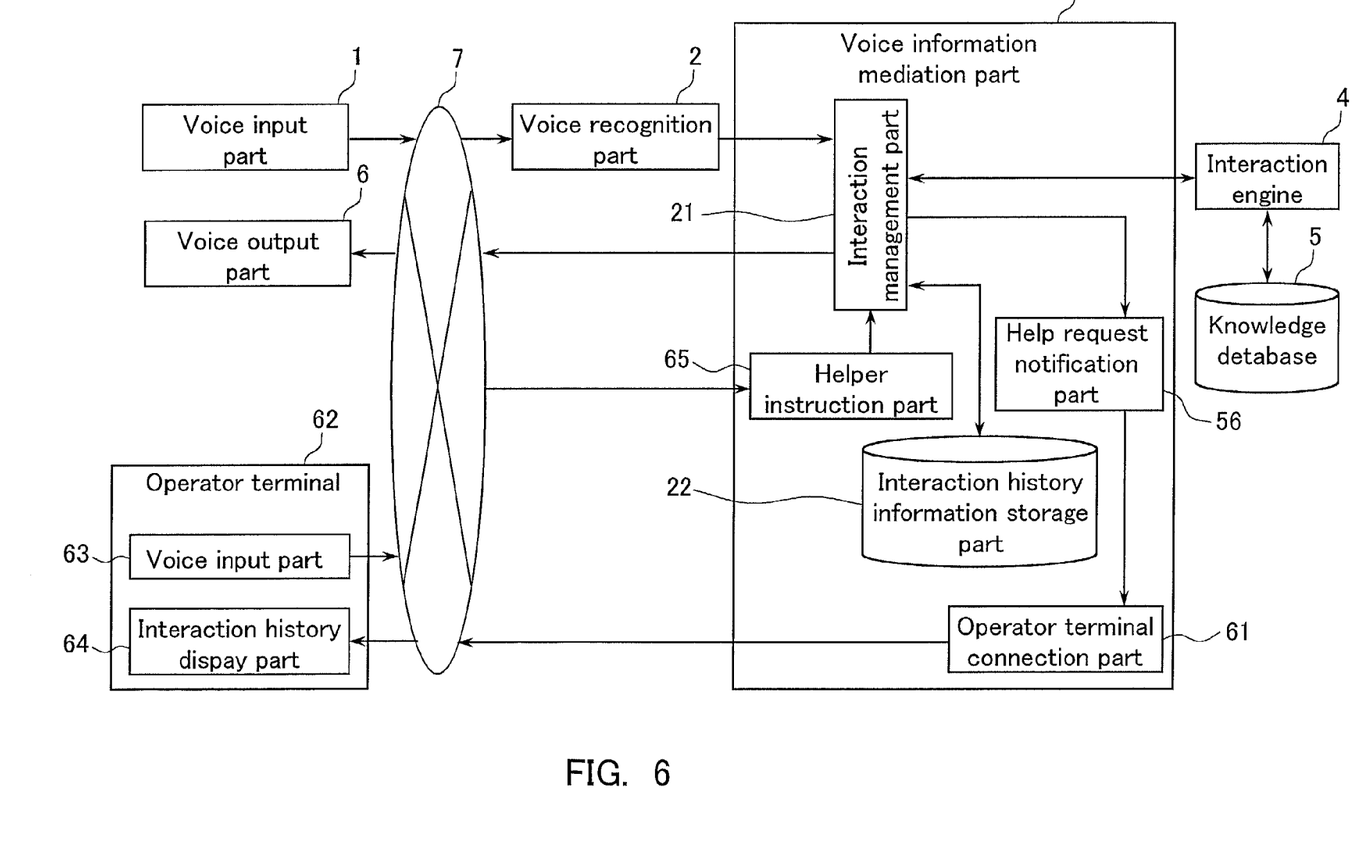
FIG. 6 shows a configuration of the voice interactive system of an embodiment of the present invention.

More specifically, as shown in FIG. 6, when a user cannot smoothly proceed interaction, an operator terminal connection part 61 is activated to allow a help request notification part 56 to automatically notify an operator of a request for help so that an operator can help the user with the interaction.

Alternatively, the following may also be possible. As shown in FIG. 6, the operator terminal connection part 61 is activated at all times irrespective of whether it is detected that a user cannot smoothly proceed interaction, and interaction history between the user and the interaction engine is displayed by the interaction history display part 64 at the operator terminal 62, whereby an operator starts helping at a timing at which the operator determines that help is required.

In this case, a help instruction part 65 is further provided. In the case where an operator determines that help is required at the operator terminal 62, a help instruction input by the operator is received by the help instruction part 65 of the voice information mediation part 3, and passed to the interaction management part 21. The interaction management part 21 that has received the help instruction enables interaction between the operator and the user to be conducted, whereby a helping action by an operator becomes possible.

Furthermore, in the case where operator's help is mainly conducted (e.g., in the case where it is detected that the interaction between the user and the interaction engine is hardly conducted, and only interaction between the operator and the interaction engine is conducted), connection may be switched so that only the interaction between the interaction engine and the operator can be conducted. More specifically, in the case where it is detected that a degree of operator's help exceeds a predetermined threshold value, the connection to the user terminal is disconnected to allow only the interaction with the operator to be conducted, whereby it is attempted to solve the problem immediately.

In this case, indexes for determining a situation where operator's help is mainly conducted include an information transmission amount per unit time, a soundless time ratio per unit time, a speaker exchange frequency per unit time, a ratio of a generation time of an operator and a user per unit time, and the like. The indexes are not particularly limited thereto. Any index may be used as long as it is determined that operator's help is mainly conducted.

In the present embodiment, the interactive system based on an input of a voice has been described. The similar system is also applicable to a text input system such as chatting. In chatting, the contents of interaction to be input with a voice are merely changed to a text input through a keyboard or the like. In this case, as an index for detecting an exchange frequency in chatting, a text data amount input per unit time, a text data amount to be communicated, and the like are considered, which have no substantial difference from the present embodiment.

Figure 7:
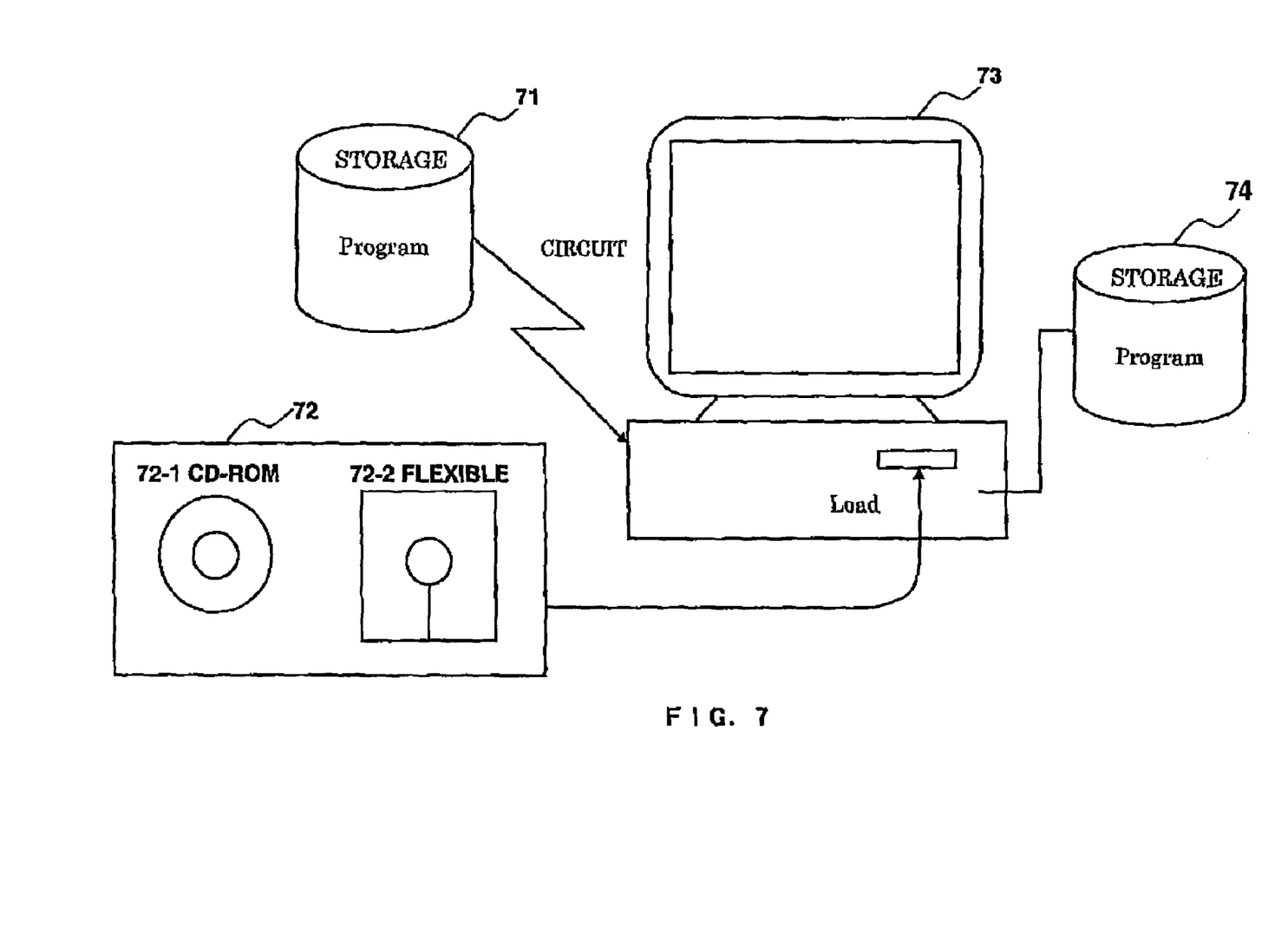
FIG. 7 illustrates a computer environment.

A program for realizing a voice interactive system of the present embodiment of the present invention is stored in not only a portable recording medium 72 such as a CD-ROM 72-1 and a flexible disk 72-2, but also another storage apparatus 71 provided at the end of a communication line and a recording medium 74 such as a hard disk and a RAM of a computer 73, as shown in FIG. 7. In execution, the program is loaded onto the computer 73, and executed on a main memory.

Furthermore, interaction history information and the like generated by the voice interactive system of the present embodiment of the present invention is also stored in not only a portable recording medium 72 such as a CD-ROM 72-1 and a flexible disk 72-2, but also another storage apparatus 71 provided at the end of a communication line and a recording medium 74 such as a hard disk and a RAM of a computer 73, as shown in FIG. 7. For example, such a recording medium is read by the computer 73 when the voice interactive system of the present invention is utilized.

As described above, according to the voice interactive system of the present invention, even in the case where there is a large difference between a knowledge level of a knowledge database and a knowledge level of a user, a timing at which operator's help is provided can be automatically controlled.

Furthermore, according to the voice interactive system of the present invention, the strictness and lenience of helping means by an operator can be determined in accordance with the progress of interaction, and operator's help at a level required by a user can be automatically determined.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A voice interactive system, comprising:
   a voice information input part inputting voice information of a first user from a first user terminal;
   a voice recognition part conducting voice recognition with respect to the voice information and analyzing contents of the voice information;
   a voice information medialion part controlling a transmission path of the voice information in accordance with the analyzed contents of the voice information;
   an interaction engine extracting contents of a response corresponding to the voice information by referring to a knowledge database and creating a synthesized voice in accordance with the extracted contents of the response; and
   a voice information output part outputting the synthesized voice, wherein the voice information mediation part monitors at all times an average reaction time, from a response of the interaction engine to a reaction of the first user, and in each of a case where the average reaction time exceeds a first threshold value that is an upper limit of a reaction time in an ordinary interaction and a case where the average reaction time is below a second threshold value that is a lower limit of the reaction time in the ordinary interaction, determines that an interaction between the first user and the interaction engine is not being smoothly conducted and allows a third-party user to participate in the interaction between the first user and the interaction engine, as a helper, from a terminal other than the first user terminal.

2. A voice interactive system according to claim 1, wherein the interaction engine further includes an interaction history information storage part for recording interaction history an a first user basis, and a helper selection part for selecting the third-party user that is considered to be most familiar with the contents of the interaction from the interaction history, as a helper, and the helper most appropriate for the contents of the voice information is selected.

3. A voice interactive system according to claim 1, further comprising
an interaction history display part displaying the interaction history stored in the interaction history information storage part to a third-party user; and
a helper instruction part for receiving a help instruction from the third-party helper user, wherein:
when the help instruction part receives the help instruction from the third-party helper user, the voice information mediation part enables the interaction between the third-party helper user and the user to be conducted, and
when a degree of help of the third-party helper user exceeds a predetermined threshold value in interaction between the third-party helper user and the first user, the interaction engine interacts only with the third-party helper user.

4. A voice interactive method, comprising:
inputting a first user's voice information from a first user terminal;
conducting voice recognition with respect to the voice information, and analyzing contents of the voice information;
controlling a transmission path of the voice information in accordance with the analyzed contents of the voice information;
outputting a synthesized voice;
controlling a transmission path of the voice information, comprising:
extracting contents of a response corresponding to the voice information by referring to a knowledge database, and creating a synthesized voice in accordance with the contents of the response, and monitoring at all times an average reaction time, from a response of the interaction engine to a reaction of the first user, and in each of a case where the average reaction time exceeds a first threshold value that is an upper limit of a reaction time in an ordinary interaction and a case where the average reaction time is below a second threshold value that is a lower limit of the reaction time in the ordinary interaction, determining that an interaction between the first user and the interaction engine is not being smoothly conducted and allowing a third-party user to participate in the interaction between the first user and the interaction engine, as a helper, from a terminal other than the first user terminal.

5. A computer-readable medium storing a program to be read and executed by a computer for processing an input user's voice information, by;
inputting a first user's voice information;
conducting voice recognition with respect to the voice information, and analyzing contents of the voice information;
controlling a transmission path of the voice information in accordance with the analyzed contents of the voice information; and
outputting a synthesized voice, wherein:
in the controlling of a transmission path of the voice information, contents of a response corresponding to the voice information being extracted by referring to a knowledge database, and a synthesized voice being created in accordance with the contents of the response, and
in the controlling of the transmission path of the voice information, monitoring at all times an average reaction time, from a response of the interaction engine to a reaction of the first user, and in each of a case where the average reaction time exceeds a first threshold value that is an upper limit of a reaction time in an ordinary interaction and a case where the average reaction time is below a second threshold value that is a lower limit of the reaction time in the ordinary interaction, determining that an interaction between the first user and the interaction engine is not being smoothly conducted and allowing third-party user to participate in the interaction between the first user and the interaction engine, as a helper, from a terminal other than a first user terminal.

6. A voice interactive system, comprising:
a voice information input part inputting voice information of a first user from a first user terminal;
a voice recognition part conducting voice recognition with respect to the voice information and analyzing contents of the voice information;
a voice information mediation part controlling a transmission path of the voice information in accordance with the analyzed contents of the voice information;
an interaction engine extracting contents of a response corresponding to the voice information by referring to a knowledge database and creating a synthesized voice in accordance with the extracted contents of the response; and
a voice information output part for outputting the synthesized voice, the voice information mediation part:
monitoring at all times whether or not an interaction between the first user and an interaction engine is being smoothly conducted and, in a case of determining that the interaction is not being smoothly conducted, allowing a third-party user to participate in the interaction between the first user and the interaction engine, as a helper, from a terminal other than the first user terminal;
determining a progress of interaction in accordance with an interaction time from a beginning of the interaction between the first user and the interaction engine and the number of accesses from the first user terminal to the interaction engine; and
changing a participation mode of the third-party user successively, in an increasing order of progress of interaction, from (1) involvement, to (2) parallel input, and to (3) switching, and in a case where the participation mode is (1) involvement, permitting the third-party user to be Involved in the interaction between the first user and the interaction engine, updating contents of the interaction from the interaction engine to the first user before the content of the interaction is output to the first user, in a case where the participation mode is (2) parallel input, permitting the third-part user to conduct an input with respect to the interaction engine in parallel with the first user, and in a case where the participation mode is (3) switching, permitting the third-part user to directly interact with the first user in place of the interaction engine.

7. A voice Interactive system according to claim 6, wherein the interaction engine further includes an interaction history information storage part for recording interaction history on a first user basis, and a helper selection part for selecting the third-party user that is considered to be most familiar with the content of the interaction from the interaction history, and most appropriate for the contents of the voice information.

8. A voice interactive system according to claim 6, further comprising:
   an interaction history display part displaying the interaction history stored in the interaction history information storage part to a third-party user; and
   a helper instruction part for receiving a help instruction from the third-party helper user, wherein:
      when the help instruction part receives the help instruction from the third-party helper user, the voice information mediation part enables the interaction between the third-party helper user and the user to be conducted, and
      when a degree of help of the third-party helper user exceeds a predetermined threshold value in interaction between the third-parry helper user and the first user, the interaction engine interacts only with the third-party helper user.

9. A voice interactive method, comprising:
   inputting voice information of a first user from a first user terminal;
   conducting voice recognition with respect to the voice information and analyzing contents of the voice information;
   controlling a transmission path of the voice information in accordance with the analyzed contents of the voice information;
   extracting contents of a response corresponding to the voice information by referring to a knowledge database and creating a synthesized voice in accordance with the extracted contents of the response; and
   outputting the synthesized voice, the voice information mediation part;
      monitoring at all times whether or not an interaction between the first user and an interaction engine is being smoothly conducted and, in a case of determining that the interaction is not being smoothly conducted, allowing a third-party user to participate in the interaction between the first user and the interaction engine, as a helper, from a terminal other than the first user terminal;
      determining a progress of interaction In accordance with an interaction time from a beginning of the interaction between the first user and the interaction engine and the number of accesses from the first user terminal to the interaction engine; and
      changing a participation mode of the third-party user successively, in an increasing order of progress of interaction, from (1) involvement, to (2) parallel input, and to (3) switching, and in a case where the participation mode is (1) involvement, permitting the third-party user to be involved in the interaction between the first user and the interaction engine, updating contents of the interaction from the interaction engine to the first user before the content of the interaction is output to the first set in a case where the participation mode is (2) parallel input, permitting the third-part user to conduct an input with respect to the interaction engine in parallel with the first user, and in a case where the participation mode is (3) switching, permitting the third-part user to directly interact with the first user in place of the interaction engine.

10. A computer-readable medium storing a program to be read and executed by a computer for processing an input user's voice information, by:
   inputting voice information of a first user from a first user terminal;
   conducting voice recognition with respect to the voice information and analyzing contents of the voice information;
   controlling a transmission path of the voice information in accordance with the analyzed contents of the voice information;
   extracting contents of a response corresponding to the voice information by referring to a knowledge database and creating a synthesized voice in accordance with the extracted contents of the response; and
   outputting the synthesized voice, the voice information mediation part:
      monitoring at all times whether or not an interaction between the first user and an interaction engine is being smoothly conducted and, in a case of determining that the interaction is not being smoothly conducted, allowing a third-party user to participate in the interaction between the first user and the interaction engine, as a helper, from a terminal other than the first user terminal;
      determining a progress of interaction in accordance with an interaction time from a beginning of the interaction between the first user and the interaction engine and the number of accesses from the first user terminal to the Interaction engine; and
      changing a participation mode of the third-party user successively, in an increasing order of progress of interaction, from (1) involvement, to (2) parallel input, and to (3) switching, and in a case where the participation mode is (1) involvement, permitting the third-party user to be involved In the interaction between the first user and the interaction engine, updating contents of the interaction from the interaction engine to the first user before the content of the interaction is output to the first user, in a case where the participation mode is (2) parallel input, permitting the third-part user to conduct an input with respect to the interaction engine in parallel with the first user, and in a case where the participation mode is (3) switching, permitting the third-part user to directly interact with the first user in place of the interaction engine.

11. A voice interactive system, comprising:
   a voice information input part inputting voice information of a first user from a first user terminal;
   a voice recognition part conducting voice recognition with respect to the voice information and analyzing contents of the voice information;

a voice information mediation part controlling a transmission path of the voice information in accordance with the analyzed contents of the voice information;

an interaction engine extracting contents of a response corresponding to the voice information by referring to a knowledge database and creating a synthesized voice in accordance with the extracted contents of the response; and a voice information output part outputting the synthesized voice, wherein the voice information mediation part monitors at all times whether or not an interaction between the first user and the interaction engine is being smoothly conducted and, in a case of determining that the user's interaction is not being smoothly conducted, allows a third-party user to participate in the interaction between the user and the interaction engine, as a helper, from a terminal other than the first user terminal;

a help request notification part operative, in a case where the voice information mediation part determines that the interaction is not being smoothly conducted, to notify a third-party helper user of such fact, and:

in a case where the help request notification part notifies the third-party user of the fact that the first user's interaction is not being smoothly conducted, the third-party user is capable of voluntarily interacting with the first user, and in a case where it is detected that only a voice of the third-party helper user continues, for a predetermined period of time or longer, in an interaction between the third-party user and the first user, the interaction engine interacts only with the third-party user.

12. A voice interactive system according to claim 11, wherein the interaction engine further includes an interaction history information storage part for recording interaction history on a first user basis, and a helper selection part for selecting the third-party user that is considered to be most familiar with the contents of the interaction from the interaction history, and most appropriate for the contents of the voice information.

13. A voice interactive system according to claim 11, further comprising an interaction history display part displaying the interaction history stored in the interaction history information storage part to a third-party user, and a helper instruction part for receiving a help instruction from the third-party helper user, wherein:
when the help instruction part receives the help instruction from the third-party helper user, the voice information mediation part enables the interaction between the third-party helper user and the user to be conducted, and
when a degree of help of the third-party helper user exceeds a predetermined threshold value in interaction between the third-party helper user and the first user, the interaction engine interacts only with the third-party helper user.

14. A voice interactive method, comprising:
inputting voice information of a first user from a first user terminal;
conducting voice recognition with respect to the voice information and analyzing contents of the voice information;
controlling a transmission path of the voice information in accordance with the analyzed contents of the voice information:

extracting contents of a response corresponding to the voice information by referring to a knowledge database and creating a synthesized voice in accordance with the extracted contents of the response; and outputting the synthesized voice, while monitoring at all times whether or not an interaction between the first user and the interaction engine is being smoothly conducted and, in a case of determining that the user's interaction is not being smoothly conducted, allowing a third-party user to participate in the interaction between the user and the interaction engine, as a helper, from a terminal other than the first user terminal, and:

in a case where the interaction is not being smoothly conducted, notifying a third-party helper user of such fact, in a case where the third-party user is notified of the fact that the first user's interaction is not being smoothly conducted, the third-party user is capable of voluntarily interacting with the first user, and in a case where it is detected that only a voice of the third-party helper user continues, for a predetermined period of time or longer, in an interaction between the third-party user and the first user, controlling the interaction engine to interact only with the third-party user.

15. A computer-readable medium storing a program to be read and executed by a computer for processing an input users voice information, by;

inputting voice information of a first user from a first user terminal;

conducting voice recognition with respect to the voice information and analyzing contents of the voice information;

controlling a transmission path of the voice information in accordance with the analyzed contents of the voice information;

extracting contents of a response corresponding to the voice information by referring to a knowledge database and creating a synthesized voice in accordance with the extracted contents of the response: and outputting the synthesized voice, while monitoring at all times whether or not an interaction between the first user and the interaction engine is being smoothly conducted and, in a case of determining that the user's interaction is not being smoothly conducted, allowing a third-party user to participate in the interaction between the user and the interaction engine, as a helper, from a terminal other than the first user terminal, and:

in a case where the interaction is not being smoothly conducted, notifying a third-party helper user of such fact, in a case where the third-party user is notified of the fact that the first user's interaction is not being smoothly conducted, the third-party user is capable of voluntarily interacting with the first user, and in a case where it is detected that only a voice of the third-party helper user continues, for a predetermined period of time or longer, in an interaction between the third-party user and the first user, controlling the interaction engine to interact only with the third-party user.

* * * * *

UNITED STATES PATENT AND TRADEMARK OFFICE
CERTIFICATE OF CORRECTION

PATENT NO. : 7,107,217 B2
APPLICATION NO. : 09/940522
DATED : September 12, 2006
INVENTOR(S) : Satoru Watanabe et al.

It is certified that error appears in the above-identified patent and that said Letters Patent is hereby corrected as shown below:

On the Title page:

Item (57) Abstract:
        Col. 2, line 1, change "Interactive" to --interactive--

Col. 2, line 11, change "use's to --user's--

Col. 2, line 14, "participate,as" to --participate, as--

Col. 2, line 14, "users" to --user's--

In the Claims:

Claim 1; Col. 10, line 56, change "medialion" to --mediation--

Claim 2, Col. 11, line 16, change "an" to --on--

Claim 2 Col. 12, line 3, after "by" change ";" to --:--

Claim 3 Col. 12, line 29, after "allowing" insert --a--

Claim 3, Col. 12, line 32, after "than" change "a" to --the--

Claim 7, Col. 13, line 12, change "Interactive" to --interactive--

Claim 7 Col. 13, line 17, change "content" to --contents--

Claim 8 Col. 13, line 34, change "third-parry" to --third-party--

Claim 9 Col. 13, line 51, after "part" change ";" to --:--

Claim 9 Col. 13, line 60, change "In" to --in--

Claim 9 Col. 14, line 7, change "set" to --user,--

Claim 10, Col. 14, line 44, change "Interaction" to --interaction--

Claim 10, Col. 14, line 50, change "In" to --in--

Claim 12, Col. 12, line 67, change "Involved" to --involved--

UNITED STATES PATENT AND TRADEMARK OFFICE
CERTIFICATE OF CORRECTION

PATENT NO. : 7,107,217 B2
APPLICATION NO. : 09/940522
DATED : September 12, 2006
INVENTOR(S) : Satoru Watanabe et al.

It is certified that error appears in the above-identified patent and that said Letters Patent is hereby corrected as shown below:

Claim 13, Col. 15, line 44, change "user," to --user;--

Claim 14, Col. 15, line 65, change "information:" to --information;--

Claim 15 Col. 16, line 29, change "users" to --user's--

Claim 15 Col. 16 line 29, change "by;" to --by:--

Claim 15 Col. 16, line 42, change "response:" to --response;--

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,107,217 B2 | Page 1 of 1 |
| APPLICATION NO. | : 09/940522 | |
| DATED | : September 12, 2006 | |
| INVENTOR(S) | : Satoru Watanabe et al. | |

It is certified that error appears in the above-identified patent and that said Letters Patent is hereby corrected as shown below:

Delete "Claim 12, Column 12, Line 67, change "Involved" to --involved--" change to --Claim 6, Column 12, Line 67, change "Involved" to --involved--.--

Signed and Sealed this

Second Day of October, 2007

JON W. DUDAS
*Director of the United States Patent and Trademark Office*